United States Patent
McAllorum et al.

(10) Patent No.: US 9,669,414 B2
(45) Date of Patent: Jun. 6, 2017

(54) MAGNETIC FILTRATION DEVICE

(71) Applicant: ECLIPSE MAGNETICS LIMITED, Sheffield, South Yorkshire (GB)

(72) Inventors: Steve McAllorum, Sheffield (GB); Kevin Martin, Sheffield (GB); Gary Liptrot, Sheffield (GB)

(73) Assignee: ECLIPSE MAGNETICS LIMITED, Sheffield (GB)

( * ) Notice: Subject to any disclaimer, the term of this patent is extended or adjusted under 35 U.S.C. 154(b) by 0 days.

(21) Appl. No.: 14/389,711

(22) PCT Filed: Apr. 2, 2013

(86) PCT No.: PCT/GB2013/050866
§ 371 (c)(1),
(2) Date: Sep. 30, 2014

(87) PCT Pub. No.: WO2013/150293
PCT Pub. Date: Oct. 10, 2013

(65) Prior Publication Data
US 2015/0068964 A1  Mar. 12, 2015

(30) Foreign Application Priority Data

Apr. 4, 2012 (GB) .................................. 1206044.8

(51) Int. Cl.
*B03C 1/30* (2006.01)
*B03C 1/02* (2006.01)
(Continued)

(52) U.S. Cl.
CPC .................. *B03C 1/30* (2013.01); *B03C 1/02* (2013.01); *B03C 1/0332* (2013.01); *B03C 1/286* (2013.01);
(Continued)

(58) Field of Classification Search
CPC ... B03C 1/286; B03C 1/0332; B03C 2201/18; B03C 2201/28; B03C 1/30; B03C 1/02;
(Continued)

(56) References Cited

U.S. PATENT DOCUMENTS 3,349,354 A * 10/1967 Miyata .................. B01J 19/087
123/536
4,585,553 A * 4/1986 Hikosaka et al. ............ 210/107
(Continued)

FOREIGN PATENT DOCUMENTS

DE  9310946 U1 * 9/1993 .............. C02F 1/481
DE  197 17 869 A1  12/1997
(Continued)

*Primary Examiner* — Krishnan S Menon
*Assistant Examiner* — Waqaas Ali
(74) *Attorney, Agent, or Firm* — Maschoff Brennan

(57) ABSTRACT

A magnetic filtration device (105) configured to entrap magnetically susceptible material and non-magnetically susceptible material. An array of magnetic columns (703, 704) of alternating north and south polarity are positioned within a plurality of chambers (308, 309) that direct the fluid flow in an extended flowpath through a magnetic field circuit created by the columns of magnets (703, 704). A separator flange (305) acts to entrap nonferrous particles for subsequent removal and isolation from a fluid network in which the device (105) maybe installed.

18 Claims, 9 Drawing Sheets

(51) Int. Cl.
  *B03C 1/033* (2006.01)
  *B03C 1/28* (2006.01)
  *B01D 35/06* (2006.01)
  *F24D 19/00* (2006.01)
  *C02F 1/48* (2006.01)
  C02F 101/20 (2006.01)
  C02F 103/02 (2006.01)
  C02F 101/10 (2006.01)
  C02F 103/00 (2006.01)

(52) U.S. Cl.
  CPC .......... *C02F 1/488* (2013.01); *F24D 19/0092* (2013.01); *B01D 35/06* (2013.01); *B03C 2201/18* (2013.01); *B03C 2201/20* (2013.01); *B03C 2201/22* (2013.01); *B03C 2201/28* (2013.01); *C02F 1/481* (2013.01); *C02F 2101/10* (2013.01); *C02F 2101/203* (2013.01); *C02F 2103/00* (2013.01); *C02F 2103/023* (2013.01); *C02F 2201/48* (2013.01); *C02F 2303/14* (2013.01)

(58) Field of Classification Search
  CPC ............ B03C 2201/22; B03C 2201/20; F24D 19/0092; B01D 35/06; C02F 1/488; C02F 2201/48; C02F 2101/10; C02F 2103/00; C02F 2303/14; C02F 2103/023; C02F 2101/203
  USPC .............. 210/695, 167.03, 167.29, 222, 223; 209/223.2, 232
  See application file for complete search history.

(56) References Cited

U.S. PATENT DOCUMENTS

| | | |
|---|---|---|
| 4,783,266 A | 11/1988 | Titch et al. |
| 2007/0090055 A1 | 4/2007 | Newman et al. |

FOREIGN PATENT DOCUMENTS

| | | | |
|---|---|---|---|
| DE | 10 2004 029 197 A1 | 1/2006 | |
| EP | 1 808 415 A1 | 7/2007 | |
| EP | 2 147 718 A1 | 1/2010 | |
| EP | 2174718 A2 * | 4/2010 | .................... 210/107 |
| GB | 855 928 A | 12/1960 | |
| GB | 2 458 647 A | 9/2009 | |
| GB | 2469145 A | 10/2010 | |
| GB | 2476825 A | 7/2011 | |

\* cited by examiner

MAGNETIC FILTRATION DEVICE

The present invention relates to a magnetic filtration device for separating magnetically susceptible material from a fluid, and in particular, although not exclusively, to a device for separating ferrous particles from a fluid flowing within a fluid network such as central heating or air conditioning systems.

Conventional water-based central heating systems, including both domestic and commercial, use a heat source such as an oil, gas or electrically powered boiler to circulate hot water through a network that comprises radiators, hot water tanks and the like interconnected by metallic and non-metallic pipework. Internal corrosion of the metallic components of the network is an endemic problem and has resulted in a number of different approaches to try and alleviate system contamination by circulation of ferrous particles within the system.

One approach is the regular purging or flushing of the contaminated fluid and replacement with a clean fluid. It is common for anticorrosion inhibitors to be introduced during these cleaning operations with a view to inhibiting or delaying the onset of ferrous particle build-up and the associated problems. However, purging operations of this type are inconvenient where, in a domestic setting, an engineer will typically be required for three to six hours to completely drain and refill the entire system.

More recently, magnetic filtration devices have been installed within central heating systems that act to continually remove ferrous particles from the working fluid in-line within the system. Example magnetic filtration devices are described in U.S. Pat. No. 4,783,266; EP 1808415; GB 2458647 and GB 2469145. These devices typically comprise a housing having an inlet and an outlet with a magnet or magnetic body positioned within the housing to entrap ferrous particles as the fluid flows through the filter.

However, due to the increased demand for boiler efficiency which had resulted in smaller diameter tubing within the boiler a number of problems have been created. In particular, poor containment of ferrous particles of different sizes and mass leads to contamination build-up within the system and in particular the small diameter tubing within the boiler in turn reducing the boiler efficiency and potentially leading to blockage. Additionally, where a magnetic filter has been in use for a long period or the system is heavily contaminated with ferrous particles, saturation and subsequent blockage of the filter represents a high risk of leakage and system failure. There is therefore a need for an improved magnetic filtration device capable of separating contaminant material from a working fluid that addresses the above problems.

Accordingly, the inventors provide a filtration device that is effective for the removal of magnetically susceptible contaminant from a working fluid, such as a domestic or commercial heating or cooling system. In particular, an array of magnetic columns of alternating north and south polarity are positioned within a plurality of chambers that direct the fluid flow in an extended flow path through a magnetic field circuit created by the columns of magnets.

The present device is optimised for capture and retention of different grades of contaminant material with regard to particle size and mass. This is achieved, in part, by a multi chamber arrangement in which the fluid flow speed within each chamber may be predetermined and regulated to provide entrapment of a specific size and/or mass of contaminant particle. Also, by directing the fluid flow through multiple chambers, the fluid flow path length is increased and hence the exposure time to the magnetic field created within the device so as to increase the effective entrapment zone and the efficiency of the filter.

The present device comprises an elongate magnetic core formed from a plurality of magnetic columns that extend along the length of the core. By specifically configuring the plurality of the columns, a desired magnetic field pattern is created within the chambers of the device that maximises contaminant entrapment whilst creating fluid flow channels around and through the entrapped contaminant that builds-up at the magnetic core over time. These fluid flow channels ensure the filter will not become blocked by contaminant.

The present device is also capable of separating both magnetically susceptible material and non ferrous material. This is advantageous as a single device may then be installed within a fluid network that performs the dual function of metallic and non-metallic particle removal efficiently and conveniently. The entrapment of non ferrous particles within the device is achieved, in part, by a separator flange positioned within the device and preferably between the internal chambers.

According to a first aspect of the present invention that is provided a magnetic filtration device to separate contaminant material from a fluid, the device comprising: a housing to provide containment of a fluid flowing through the device, the housing having a fluid inlet and a fluid outlet; an elongate magnetic core having a plurality of columns of magnets extending along the length of the core, at least one column having a north polarity extending substantially the length of the column and at least one column having a south polarity extending substantially the length of the column wherein the north and south polarity columns are arranged lengthwise around a longitudinal axis of the core in alternating north and south polarity; a first elongate chamber within the housing, the first chamber in fluid communication with the inlet substantially towards a first end to allow fluid to enter the first chamber; a second elongate chamber within the housing, the second chamber in fluid communication with the outlet substantially towards a first end to allow the fluid to exit the second chamber; a passageway connecting the first and second elongate chambers in internal fluid communication towards their respective second ends such that the fluid is directed to flow from the inlet past substantially the full length of the magnetic core in a first direction through the passageway, past substantially the full length of the magnetic core in a second direction opposed to the first direction to the outlet; wherein a magnetic field generated by the magnetic core is created in the fluid flow path in the first and second chambers to entrap contaminant material within the housing as it flows between the inlet and the outlet.

Preferably, the device comprises at least four columns of magnets, at least two columns having a north polarity and at least two columns having a south polarity, the columns arranged lengthwise around the longitudinal axis of the core in alternating north and south polarity. Using a plurality of columns of magnet of alternating polarity creates a predetermined magnetic field pattern or shape profile within the device that is optimised for entrapment. Accordingly, the present device is more compact and is lighter and less expensive than existing filters as the size of the magnets is maintained to a minimum.

Preferably, the device comprises an elongate tube to house the magnetic core, the core capable of being inserted and removed at the tube. Preferably, the device further comprises a partition to divide the housing into the first and second chambers, the partition extending lengthwise about the magnetic core. By increasing the fluid flow path distance within the device and accordingly the exposure time to the magnetic field, the fluid flow speed within the present device is such that only a small pressure differential is created within the fluid network and therefore any increase in the power demand of the boiler circulation pump is reduced. The present device is therefore energy efficient over conventional magnetic filters.

Preferably, the present device comprises a separator flange positioned at the passageway in the fluid flow path between the first and second chambers, the separator flange configured to entrap non-magnetically susceptible contaminant material within the housing as the fluid flows from the first to the second chamber. Optionally, the separator flange comprises a plurality of apertures positioned at the interface with the second chamber. Preferably, the device further comprises a mesh mounted at the flange substantially at the interface with the second chamber.

Optionally, the device further comprises a drain tap at the housing to allow fluid to be drained from the housing. The drain tap maybe positioned at any region of the housing. Preferably, the drain tap is positioned at the bottom of the housing at a region of the passageway between the first and second chambers. Optionally, the drain tap maybe positioned adjacent the first or the second chambers. Alternatively, the drain tap maybe positioned at an upper region of the housing towards the inlet and outlet end.

Preferably, the partition comprises a first wing extending radially outward from the core and a second wing extending radially outward from the core, the first and second wings extending substantially the length of the core to, in part, define the first and second chambers within the housing. Preferably, the first and second chambers are defined by an internal facing wall of the housing, the elongate tube and the first and the second wing. Optionally, the first and second chambers comprise a volume that is substantially equal. Alternatively, a volume of the first chamber is greater than a volume of the second chamber such that a fluid flow speed in the first chamber is less than a fluid flow speed in the second chamber.

Optionally, the device further comprises a connector port having: a fluid entry port to receive fluid from an external fluid flow system; a housing inlet port to provide fluid communication between the fluid entry port and the inlet of the housing; a fluid exit port to allow fluid to flow from the device to the external fluid system; and a housing outlet port to provide fluid communication between the fluid exit port and the outlet of the housing. Additionally, the device may further comprise a lid removably attachable to the housing, the lid comprising: a first directing channel in fluid communication with the fluid inlet of the housing and the housing inlet port of the connector port; and a second directing channel in fluid communication with the fluid outlet of the housing and the fluid exit port of the connector port. A three-piece device is advantageous for convenient attachment and detachment from the fluid network. In particular, the connector port maybe permanently attached to the fluid network such that the lid and/or the housing may then be removed during a cleaning process of the filter to remove contaminant build-up. Preferably, an axis of the fluid entry port and an axis of the fluid exit port are substantially aligned. Optionally, the first and second directing channels are arranged to divert the fluid flow through substantially 90° when flowing between a first and second respective end of the first and second directing channels.

Optionally, the device further comprises a contaminant saturation indicator configured to be responsive to an amount of magnetically susceptible contaminant entrapped within the housing by the magnetic core. Optionally, the saturation indicator comprises a spring biased magnetic plunger located externally of the housing such that the position and movement of the magnetic plunger is determined by the level of magnetic attraction to the magnetic core. The magnetic field strength experienced by the magnetic plunger is affected by the amount of contaminant deposited on the magnetic core so as to provide a suitable contaminant sensor and indicator.

Optionally, the plurality of columns of magnets are configured to create substantially the same strength of magnetic field. Optionally, the plurality of columns of magnets are configured to create a different strength of magnetic field within the first chamber relative to the second chamber.

The magnetic core of the filter device of the present invention comprises at least four columns of magnets, each column having a single, substantially uniform polarity extending along its length. The magnets are positioned lengthways around a central longitudinal axis of the core in an alternating north and south polarity. The effect of this is the creation of a profiled magnetic field gradient perpendicular to the core axis which in turn creates 'fluid flow path channels' between the housing wall and the magnetic core as contaminant is entrapped around the core. These flow path channels correspond to regions of low magnetic field intensity extending along the length of the column. Corresponding regions of high magnetic field intensity serve to attract contaminant material which migrates into these higher field gradient regions thereby creating the contaminant free channels along which the fluid may flow.

The magnetic flux circuit geometry, of longitudinally extending high and low field gradients, provides for a controlled deposition of contaminant on the magnetic core. Accordingly, as the present device ensures fluid flow is maintained at contaminant saturation, blockage of the fluid flow is prevented which would otherwise cause leakage and system failure.

A specific implementation of the present invention will now be described, by way of example only and with reference to the accompanying drawings in which.

Figure 1:
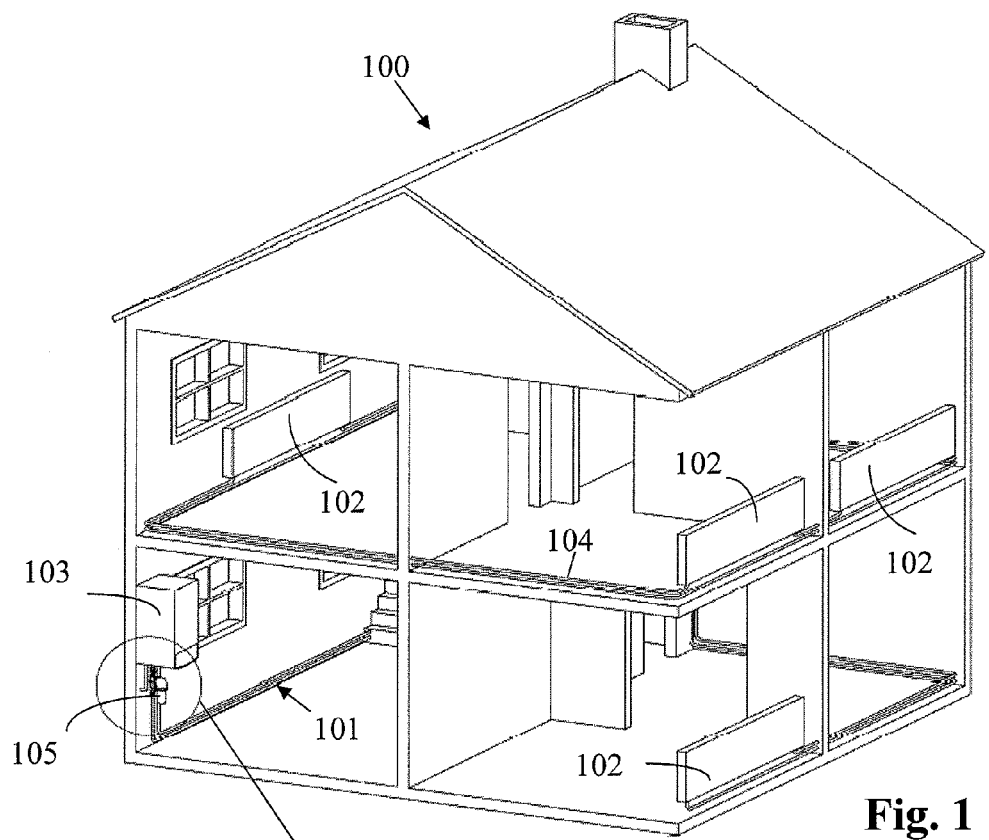
FIG. 1 is a schematic perspective illustration of a central heating system within a domestic building.

Referring to FIG. 1, a building 100 comprises a central heating system 101 that typically includes metallic or plastic pipework 104 that serves to interconnect a plurality of radiators 102 located within different rooms to a central boiler 103. Boiler 103 is typically a gas, electricity or oil powered boiler and functions to heat a central heating fluid, typically water, for subsequent circulation through pipework 104 and radiators 102.

System 101 further comprises a magnetic filtration device 105 located in close proximity to boiler 103 and connected in the fluid flow path of pipework 104 such that the central heating fluid flows through the device 105 immediately before re-entering boiler 103 for reheating and subsequent return to the radiators 102.

Figure 2:
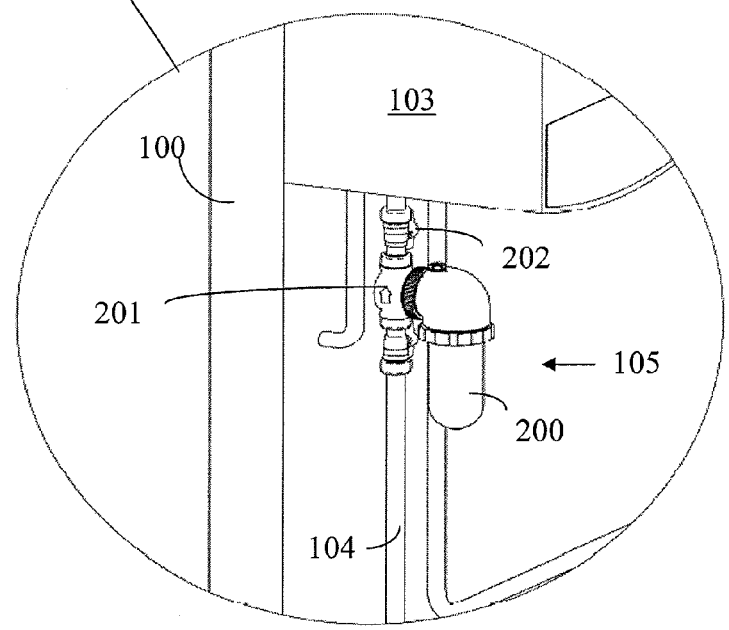
FIG. 2 is a perspective view of a magnetic filtration device installed within the central heating system of FIG. 1 according to a specific implementation of the present invention.

Referring to FIG. 2, filtration device 105 comprises a housing 200 that accommodates internal components such as a magnetic core illustrated with reference to FIGS. 3 to 8. Device 105 is connected in fluid communication with pipework 104 by suitable connections 201. Manual control valves 202 are positioned at the upstream and downstream points of connection of filter device 105 within fluid circuit 104 so as to allow fluid isolation of device 105 from the network 101.

Figure 3:
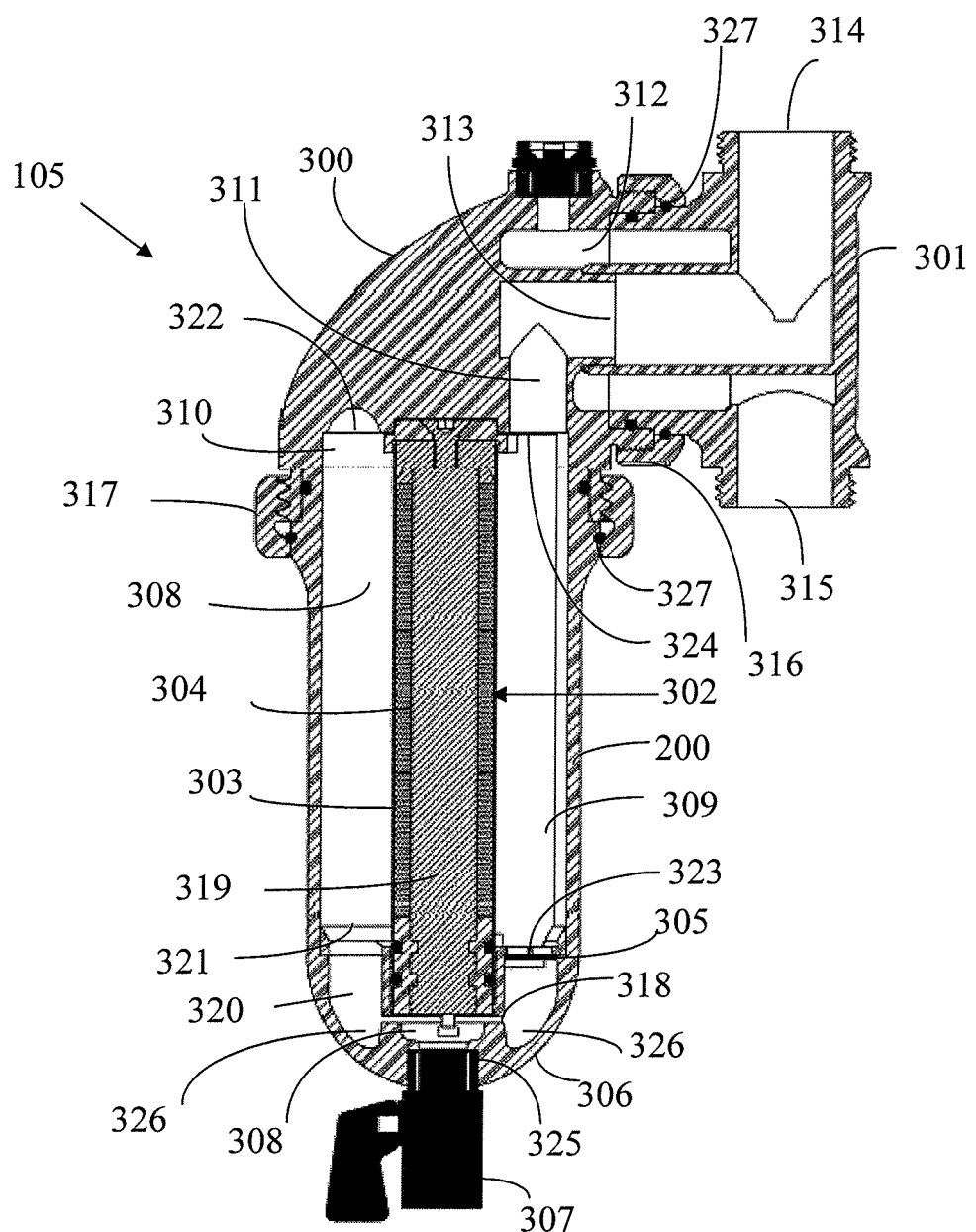
FIG. 3 is a cross sectional side view of the magnetic filtration device of FIG. 2.

Referring to FIG. 3, filter 105 comprises housing 200, a lid 300 and a connection port 301. A fluid flow outlet 314 is formed within port 301 and is aligned substantially coaxially with a fluid flow inlet 315. Port 301 is coupled in fluid communication with lid 300 that has a fluid inlet 312 coupled in fluid communication to inlet 315 of port 301 and a fluid outlet 311 coupled in fluid communication to outlet 314 of port 301. A screw thread collar 316 is provided at the junction between lid 300 and port 301 to allow lid 300 to be detachably mountable at port 301. A plurality of o-rings 327 are provided at the junction between port 301 and lid 300 to provide a fluid tight seal.

Housing 200 is coupled in fluid communication with lid 300 at an opposite end with respect to port 301. Housing 200 comprises a fluid inlet 312 and a fluid outlet 311 coupled to the respective inlet 312 and outlet 313 of lid 300. Housing 200 is substantially cylindrical and comprises a curved or dish-shaped lower end region 306. An attachment collar 317 is provided substantially at a first end 322 of housing 200 and serves to releasably attach housing 200 to lid 300. A fluid tight seal at the junction with lid 300 is provided by suitable o-rings 327.

A hollow interior of housing 200 is spacially divided into a first elongate chamber 308 and a second elongate chamber 309, both chambers 308, 309 extending internally the length of elongate housing 200 from the first (upper inlet and outlet) end to the second (lower curved) end 306.

An elongate magnetic core 302 extends lengthwise and substantially centrally within housing 200 from the first end 322 to the second end 306. Magnetic core 302 comprises an elongate tube 303 that houses magnetic bodies 304 arranged circumferentially around a central column 319.

First chamber 308 is aligned substantially parallel with second chamber 309 with both chambers 308 and 309 partitioned and isolated from fluid communication except for a communication passageway 320 that extends between a second end 321 of first chamber 308 and a second end 323 of second chamber 309. A separator flange 305 is positioned at the interface between first chamber end 321, second chamber end 323 and passageway 320. Flange 305 extends radially outward from the central core 302 and is aligned substantially perpendicular to a central axis of elongate core 302. Flange 305 is thereby orientated substantially perpendicular to the general fluid flow direction through first chamber 308, and subsequently second chamber 309 between inlet 310 and outlet 311.

A drainage aperture 325 is formed at the lower curved or dish-shaped region 306. A drain tap 307 is partially accommodated within aperture 325 and provides manual control of fluid drainage from housing 200 and in particular chambers 308, 309. Aperture 325 is bordered internally by walls 318 that extend inward from housing walls towards the magnetic core 302. A well 308 is created between the opposed walls 318 to provide a drainage conduit from chambers 308, 309. Walls 318 also create troughs 326 at the very lower internal region of passageway 320. Troughs 326 provide entrapment zones for non-magnetically susceptible contaminant that may otherwise block drainage aperture 325 when fluid is drained from chambers 308, 309 by actuation of tap 307.

Figure 4:
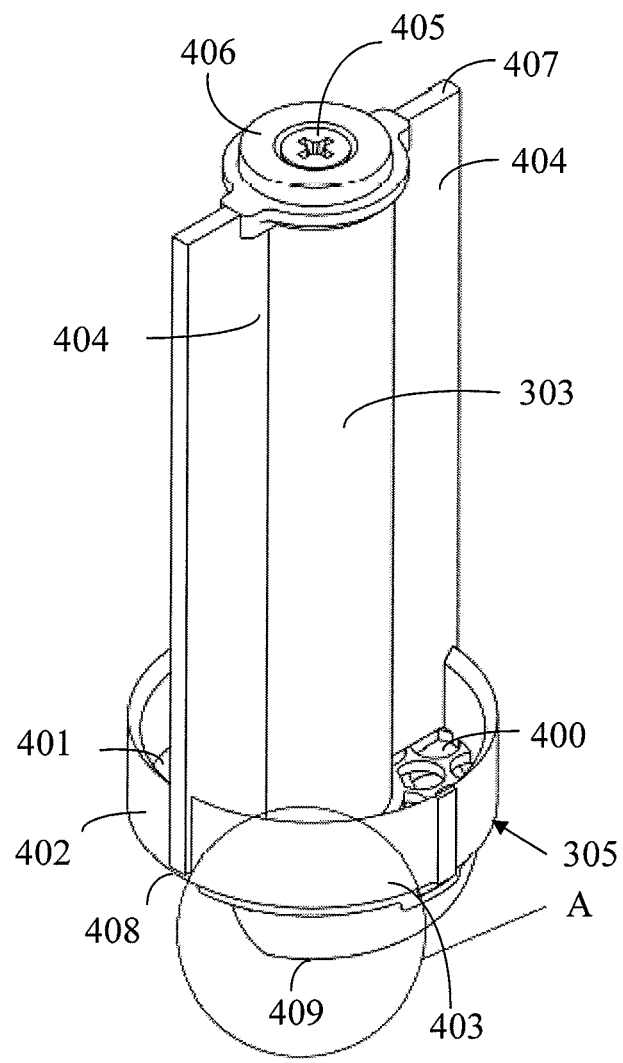
FIG. 4 is a perspective view of a magnetic core and an internal partition and a separator flange of the device of FIG. 3.
Figure 5:
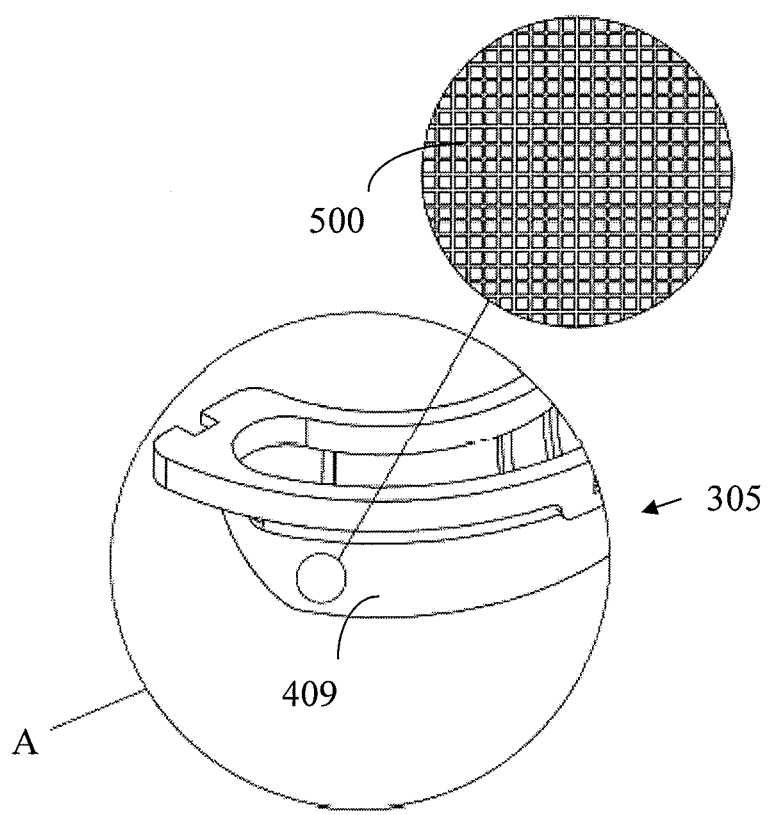
FIG. 5 is a partial exploded and magnified view of a lower section of the inner components of the device of FIG. 4.
Figure 6:
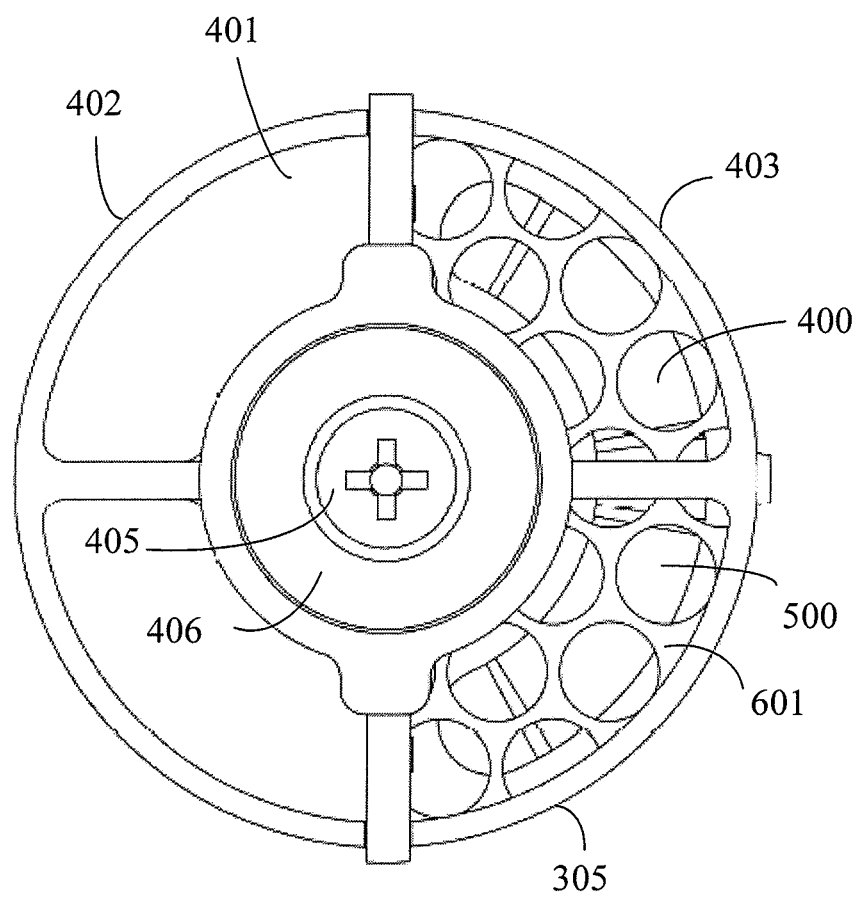
FIG. 6 is a plan view of the inner components of the device of FIG. 4.

Referring to FIGS. 4 to 6, magnetic core 302 is formed as a modular assembly in which various components may be separated from one another to enable convenient cleaning of the device 105 and in particular removal of magnetically susceptible and non-magnetically susceptible contaminant entrapped within housing 200. Elongate tube 303 extends the full length of core 302. A cap 406 is removably attached to a first end of tube 303 by removable screw 405 such that magnetic core 302 may be removed from tube 303 by removal of lid 406 and screw 405. A substantially planar elongate wing 404 extends radially outward from tube 303 diametrically opposed to a second substantially planar elongate wing 404 that also extends radially outward from tube 303. Both wings 404, collectively define an elongate partition that is effective to divide the internal cavity of housing 200 into first chamber 308 and second chamber 309. Accordingly, the combined diameter of tube 303 and radial distance by which wings 404 extend from tube 303 is approximately equal to an internal diameter of housing 200.

Separator flange 305 is positioned towards a lower end of tube 303 and wings 408 and comprises a substantially disk configuration having a substantially circular cross sectional profile when viewed in plan. Accordingly, lower end 408 is positioned at the second (lower) end 306 of housing 200 with a second upper end 407 of the tune and wing assembly 303, 408 being positioned at the first (upper) end 322 of housing 200. Flange 305, when viewed in plan, is divided into a first half 402 and a second half 403. First half 402 is intended to be positioned at second end 321 of chamber 308 and second half 403 is intended to be positioned at second end 323 of chamber 309. First half 402 is further divided into two relatively large aperture regions 401 that extends from an outer perimeter of flange 305 radially inward to the outer surface of elongate tube 303. The second half 403 comprises a webbing 601 that extends from the outer perimeter to the external surface of tube 303. Webbing 601 comprises a plurality of flow apertures 400. A mesh or gauze 500 is removably clipped in position at webbing 601 and comprises a gauge being much smaller than a diameter of apertures 400. Webbing 601 and gauze 500 extend over the entire segment of second half 403 defined by the perimeter of flange 305, the tube 303 and the wings 404. When viewed in plan, flange 305 is divided into the first and second halves 402, 403 by tube 303 and wings 404.

Figures 7, 8:
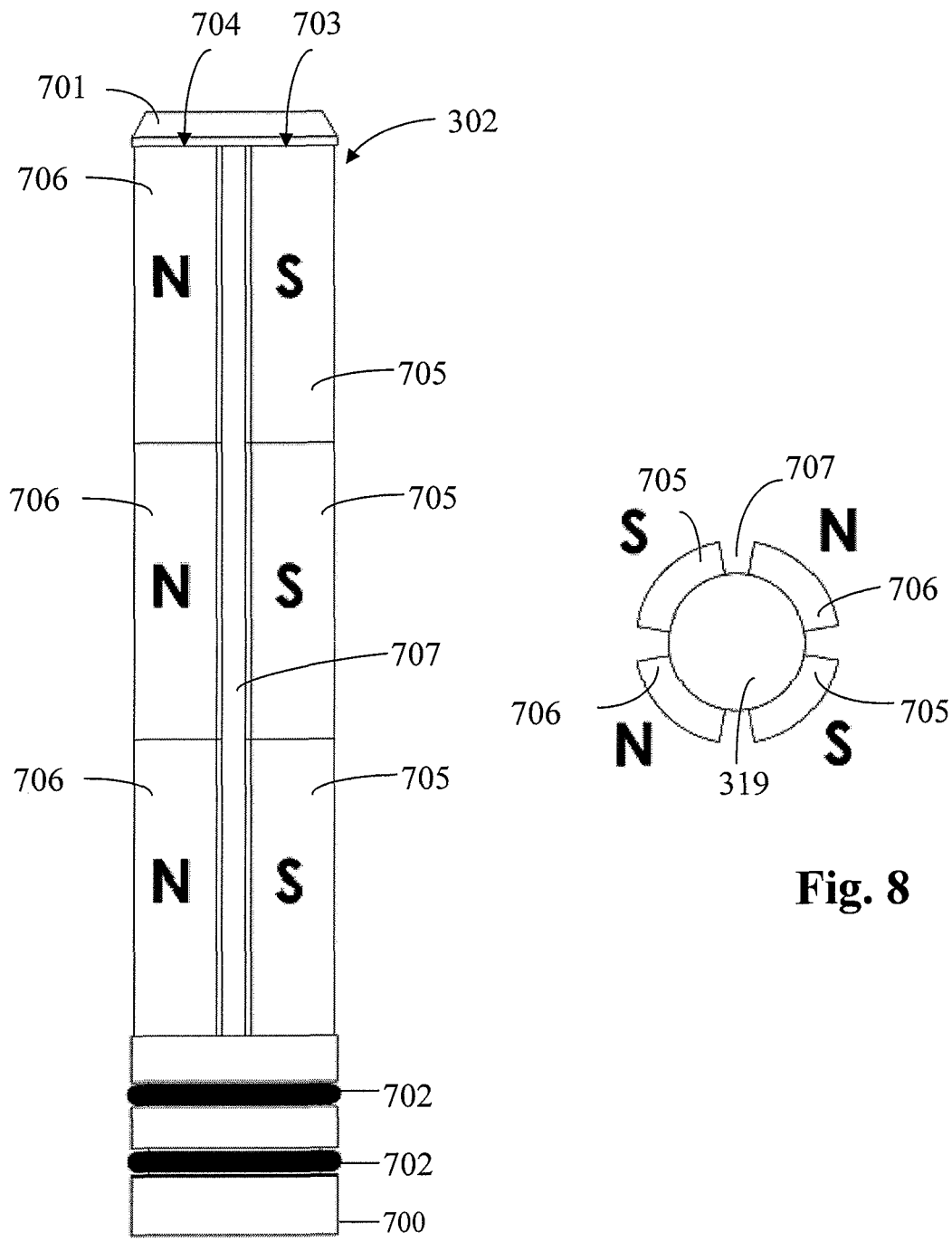
FIG. 7 is a side elevation view of the magnetic core of the device of FIG. 3 having a plurality of columns of magnets extending lengthwise along the elongate core.
FIG. 8 is a plan cross section view of the magnetic core of FIG. 7 in which the columns of magnets are distributed circumferentially around an inner core in alternating north and south polarity according to a specific implementation of the present invention.

Referring to FIGS. 7 and 8, elongate magnetic core 302 comprises a plurality of elongate magnetic columns distributed around the central inner column 319. In particular, a first magnetic column 703 is formed from three south polarity magnets 705 positioned end-to-end and extending along the length of core 302 between a first end 700 and a second end 701. A second magnetic column 704 is formed from three north polarity magnets 706 also arranged end-to-end between first end 700 and second end 701. A spacial gap 707 is provided between columns 703, 704. A further south polarity column 703 and north polarity column 704 are arranged around central column 319 to provide four columns of magnets having a north-south-north-south distribution circumferentially around inner column 319. A plurality of o-rings 702 are provided towards first end 700 of core 302 to ensure the magnetic columns 703, 704 are retained in fluid type isolation from chambers 308, 309 and passageway 320.

Figure 9:
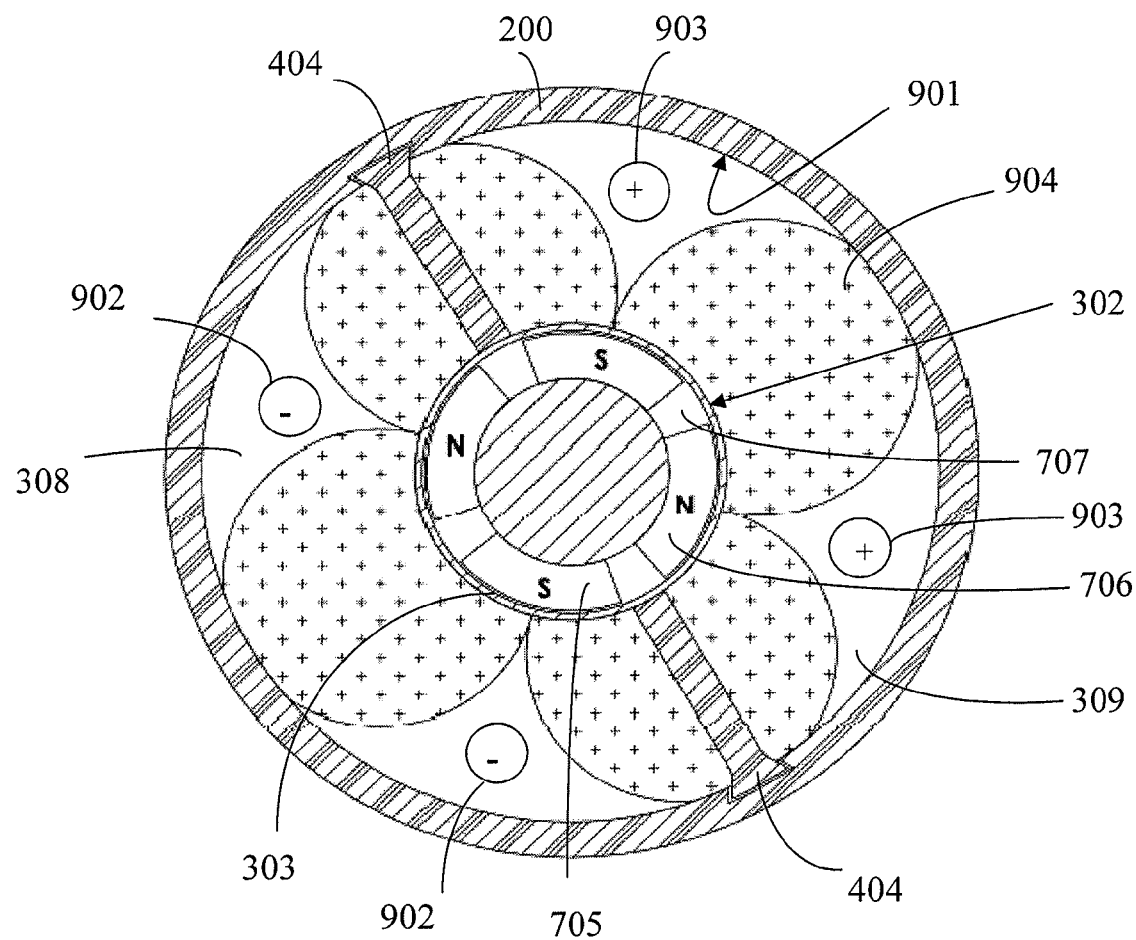
FIG. 9 is a schematic plan view of the device of FIG. 3 illustrating the magnetic field circuit generated by the magnetic core within the fluid flow path through the device according to a specific implementation of the present invention.

Referring to FIG. 9, the alternating polarity distribution of magnetic columns 703, 704 at core 302 creates a desired magnetic field circuit within housing 200 and in particular chambers 308, 309. In particular, four elongate lobes 904 of relative high magnetic field strength are created lengthwise along core 302 within housing 200. Two lobes 904 are bisected by the radially extending wings 404 that, in part, define first and second chambers 308, 309. In addition to the high field strength lobes 904 that extends from the centrally extending elongate tube 303 to the inner wall surface 901 of housing 200, corresponding relatively low magnetic field strength channels 902, 903 are created and extend between lobes 904. Channels 902, 903 extend lengthwise through housing 200 from first end 322 (at inlet 310 and outlet 311) of chambers 308, 309 do the respective second ends 321, 323.

In use, and when fluid is flowing through the device 105, the lobes 904 of high magnetic field strength entrap magnetically susceptible contaminant flowing through chambers 308 and 309 between inlet 310 and outlet 311 via passageway 320. Any magnetically susceptible material flowing within channels 902, 903 will migrate to the high field strength lobes 904. Accordingly, a uniform contaminant build-up profile is created within each chamber 308, 309 about central core 302. The polarity distribution of magnetic columns 703, 704 within housing 200 ensures fluid flow continues at and beyond the complete contaminant saturation point due to the creation of fluid flow channels 902, 903.

Additionally, non magnetically susceptible contaminant is captured by separator flange 305 and in particular gauze 500 and webbing 601. The non ferrous particles are captured and retained in passageway 320 at trough 326. Additionally, it has been observed that non-magnetically susceptible contaminant is also captured at the outer regions of contaminant entrapment lobes 904 as the ferrous particles accumulate to create an entangled labyrinth or porous network.

Contaminant saturation may be monitored by one or a plurality of saturation sensors and indicators positioned at device 105 and in particular housing 200. Such sensors include magnetic plunger-based devices or other electronic, mechanical or magnetic sensors being sensitive to a magnetic field strength generated by core 302.

Figure 10:
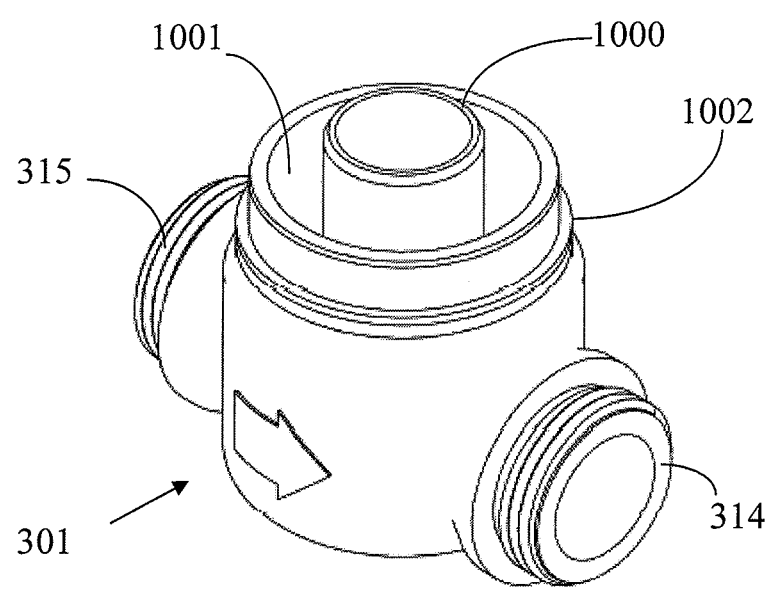
FIG. 10 is a perspective view of a connection port to attach the filtration device of FIG. 3 to the central heating system of FIG. 1.
Figure 11:
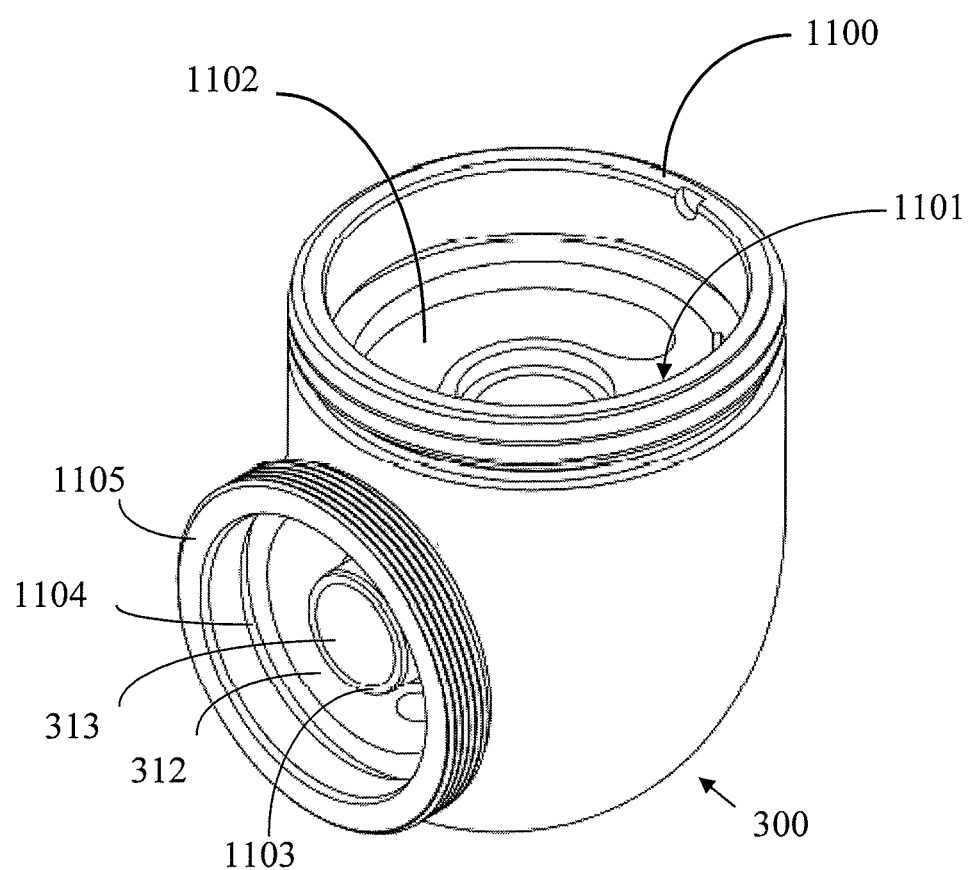
FIG. 11 is a perspective view of a lid to couple a housing of the magnetic core of FIG. 7 to the port of FIG. 10.

Referring to FIGS. 10 and 11, port 301 comprises an attachment region 1002 for attachment and releasable connection to lid 300 that also comprises a corresponding attachment region 1105. Port 301 further comprises a housing outlet port 1000 and a housing inlet port 1001 connectable in fluid communication with a respective inlet 312 and outlet 313 of lid 300. Directing conduits 1103 and 1104 are configured to direct fluid flow through lid 300 between the port side inlet and outlet 312, 313 and a housing side inlet and outlet 1101, 1102. According to the specific implementation, the fluid flow through lid 300 is diverted through substantially 90° via directing conduits 1103, 1104.

According to the specific implementation, a volume of first chamber 308 is approximately equal to a volume of second chamber 309 such that partition wings 404 are diametrically opposed at core 302. Additionally, a magnetic field strength created by the four columns 703, 704, is substantially equal such that an approximate volume of the relative high magnetic field strength lobes 904 are substantially equal.

According to further specific implementations, partition wings 404 may be off-set from a central location to partition chambers 308, 309 to have different internal volumes. Accordingly, the fluid flow velocities through chambers 308, 309 may be different being resultant from a difference in internal volumes and in particular the cross sectional size of each chamber in a direction perpendicular to the axial length of housing 200. According to a specific implementation, a volume of first chamber 308 maybe greater than second chamber 309 such that a fluid flow speed through first chamber 308 is slower than the corresponding flow speed through second chamber 309.

Additionally, where the volume of chamber 308 is greater than the volume of chamber 309, one column of south polarity magnets 703 and one column of north polarity magnets 704 orientated within first chamber 308 may be configured to create a weaker magnetic field strength relative to corresponding magnetic columns 703, 704 within second chamber 309. Alternatively, the relative volumes of chambers 308 and 309 and magnetic field strengths created by columns 703, 704 within the respective chambers 308, 309 may be opposite to that described above. In particular, the respective volumes of chambers 308, 309 and magnetic field strengths created by columns 703, 704 may be configured specifically optimise the flow speed through the chambers 308, 309. This optimisation includes consideration of the gravitational effect on the fluid flowing in a downward direction, through chamber 308 via fluid flow channels 902, and in the reverse upward direction, through chamber 309 via fluid flow channels 903.

The invention claimed is:

1. A magnetic filtration device to separate contaminant material from a fluid, the device comprising:
   a housing to provide containment of a fluid flowing through the device, the housing having a fluid inlet and a fluid outlet;
   an elongate magnetic core having a plurality of columns of magnets extending along the length of the core, at least one column having a north polarity extending substantially the length of the column and at least one column having a south polarity extending substantially the length of the column wherein the north and south polarity columns are arranged lengthwise around a longitudinal axis of the core in alternating north and south polarity;
   a first elongate chamber within the housing, the first chamber in fluid communication with the inlet at a first end to allow fluid to enter the first chamber;
   a second elongate chamber within the housing, the second chamber in fluid communication with the outlet at a first end to allow the fluid to exit the second chamber, the first and second chambers positioned respectively between and defined by an internal facing surface of the housing and an external facing surface of the magnetic core, wherein the elongate magnetic core extends substantially the full length of the first and second chambers between the first end and the second end of the first and second chambers;

a passageway connecting the first and second elongate chambers in internal fluid communication at their respective second ends such that the fluid is directed to flow from the inlet past substantially the full length of the magnetic core in a first direction through the passageway, past substantially the full length of the magnetic core in a second direction opposed to the first direction to the outlet; and a separator flange positioned at the passageway in the fluid flow path between the first and second chambers to entrap non-magnetically susceptible contaminant material within the housing as the fluid flows between the inlet and the outlet, wherein a magnetic field generated by the magnetic core is created in the fluid flow path in the first and second chambers to entrap contaminant material within the first and second chambers as it flows between the inlet and the outlet.

2. The device as claimed in claim 1 comprising at least four columns of magnets, at least two columns having a north polarity and at least two columns having a south polarity, the columns arranged lengthwise around the longitudinal axis of the core in alternating north and south polarity.

3. The device as claimed in claim 1 further comprising an elongate tube to house the magnetic core, the core capable of being inserted and removed at the tube.

4. The device as claimed in claim 3 further comprising a partition to divide the housing into the first and second chambers, the partition extending lengthwise about the magnetic core.

5. The device as claimed in claim 1 wherein the separator flange comprises a plurality of apertures positioned at the interface with the second chamber.

6. The device as claimed in claims 1 further comprising a mesh mounted at the flange substantially at the interface with the second chamber.

7. The device as claimed in claim 1 further comprising a drain tap at the housing to allow fluid to be drained from the housing.

8. The device as claimed in claim 4 wherein the partition comprises a first wing extending radially outward from the core and a second wing extending radially outward from the core, the first and second wings extending substantially the length of the core to, in part, define the first and second chambers within the housing.

9. The device as claimed in claim 8 wherein the first and second chambers are defined by the internal facing surface of the housing, the elongate tube and the first and the second wing.

10. The device as claimed in claim 1 wherein the first and second chambers comprise a volume that is substantially equal.

11. The device as claimed in claim 1 wherein a volume of the first chamber is greater than a volume of the second chamber such that a fluid flow speed in the first chamber is less than a fluid flow speed in the second chamber.

12. The device as claimed in claim 1 further comprising a connector port having:
- a fluid entry port to receive fluid from an external fluid flow system;
- a housing inlet port to provide fluid communication between the fluid entry port and the inlet of the housing;
- a fluid exit port to allow fluid to flow from the device to the external fluid system; and
- a housing outlet port to provide fluid communication between the fluid exit port and the outlet of the housing.

13. The device as claimed in claim 12 further comprising a lid removably attachable to the housing, the lid comprising:
- a first directing channel in fluid communication with the fluid inlet of the housing and the housing inlet port of the connector port; and
  - a second directing channel in fluid communication with the fluid outlet of the housing and the fluid exit port of the connector port.

14. The device as claimed in claim 1 further comprising a contaminant saturation indicator configured to be responsive to an amount of magnetically susceptible contaminant entrapped within the housing by the magnetic core.

15. The device as claimed in claim 12 wherein an axis of the fluid entry port and an axis of the fluid exit port are substantially aligned.

16. The device as claimed in claim 13 wherein the first and second directing channels are arranged to divert the fluid flow through substantially 90° when flowing between a first and second respective end of the first and second directing channels.

17. The device as claimed in claim 1 wherein the plurality of columns of magnets are configured to create substantially the same strength of magnetic field.

18. The device as claimed in claim 1 wherein the plurality of columns of magnets are configured to create a different strength of magnetic field within the first chamber relative to the second chamber.

* * * * *